US010656789B2

(12) United States Patent
Joshi et al.

(10) Patent No.: US 10,656,789 B2
(45) Date of Patent: May 19, 2020

(54) LOCATING EVENT ON TIMELINE (71) Applicant: Microsoft Technology Licensing, LLC, Redmond, WA (US)

(72) Inventors: Neel Joshi, Bellevue, WA (US); Jeannine Boone, Seattle, WA (US); Joan Li, Seattle, WA (US); Montine Rummel, Kirkland, WA (US); Johanna Hawkins, Redmond, WA (US); Mark Healy, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 448 days.

(21) Appl. No.: 14/518,664

(22) Filed: Oct. 20, 2014

(65) Prior Publication Data
US 2015/0370421 A1    Dec. 24, 2015

Related U.S. Application Data (60) Provisional application No. 62/015,350, filed on Jun. 20, 2014.

(51) Int. Cl.
| G06F 3/00 | (2006.01) |
| G06F 3/0482 | (2013.01) |
| G06F 3/0484 | (2013.01) |
| G06F 3/0485 | (2013.01) |
| H04L 29/08 | (2006.01) |

(Continued)

(52) U.S. Cl.
CPC ......... *G06F 3/0482* (2013.01); *G06F 3/0485* (2013.01); *G06F 3/0486* (2013.01); *G06F 3/04842* (2013.01); *G06F 3/04847* (2013.01); *G06F 3/04855* (2013.01); *G06F 3/04883* (2013.01); *G06F 16/903* (2019.01); *G06F 16/9535* (2019.01); *G06Q 10/109* (2013.01); *G06Q 10/1093* (2013.01);

(Continued)

(58) Field of Classification Search
CPC .......................... G06F 3/0482; G06F 3/04842
See application file for complete search history.

(56) References Cited

U.S. PATENT DOCUMENTS

| 5,649,182 A | 7/1997 | Reitz |
| 5,745,110 A | 4/1998 | Ertemalp |

(Continued)

FOREIGN PATENT DOCUMENTS

| CN | 1786852 A | 6/2006 |
| CN | 1868202 A | 11/2006 |
| CN | 101501713 A | 8/2009 |

OTHER PUBLICATIONS

"International Search Report & Written Opinion Received for PCT Patent Application No. PCT/US2015/036571", dated Sep. 11, 2015, 9 Pages.

(Continued)

*Primary Examiner* — Ryan F Pitaro
(74) *Attorney, Agent, or Firm* — Michael Best & Friedrich LLP (57) ABSTRACT

Locating an event on a timeline is provided. A calendar application may locate an event on a timeline by detecting a selection action on the event on a calendar. A context menu is displayed on the calendar, where the context menu includes a search control. An activation of the search control is detected. The event is located on the timeline of the calendar. The event is displayed on the timeline.

17 Claims, 10 Drawing Sheets

(51) Int. Cl.
  *G06F 16/903* (2019.01)
  *G06F 16/9535* (2019.01)
  *G06Q 10/10* (2012.01)
  *G06F 3/0486* (2013.01)
  *G06F 3/0488* (2013.01)
  *H04L 12/18* (2006.01)
  *H04L 12/58* (2006.01)

(52) U.S. Cl.
  CPC ......... *H04L 12/1813* (2013.01); *H04L 51/08* (2013.01); *H04L 67/02* (2013.01)

(56) References Cited

U.S. PATENT DOCUMENTS

| | | | |
|---|---|---|---|
| 5,898,431 | A | 4/1999 | Webster et al. |
| 6,016,478 | A | 1/2000 | Zhang et al. |
| 6,360,217 | B1 | 3/2002 | Gopal et al. |
| 6,369,840 | B1 | 4/2002 | Barnett et al. |
| 6,603,489 | B1 | 8/2003 | Edlund et al. |
| 6,678,698 | B2 | 1/2004 | Fredell et al. |
| 7,149,810 | B1 * | 12/2006 | Miller .................. G06Q 10/109 709/246 |
| 7,263,667 | B1 | 8/2007 | Hoellerer et al. |
| 7,349,920 | B1 | 3/2008 | Feinberg et al. |
| 7,502,798 | B2 | 3/2009 | Trowbridge et al. |
| 7,673,248 | B2 | 3/2010 | Narayanaswami |
| 7,721,210 | B2 | 5/2010 | Mansikkaniemi et al. |
| 7,870,194 | B2 | 1/2011 | Michel et al. |
| 7,921,026 | B2 | 4/2011 | O'Cull et al. |
| 7,933,955 | B2 | 4/2011 | Khalatian |
| 8,005,906 | B2 | 8/2011 | Hayashi et al. |
| 8,122,362 | B2 | 2/2012 | Brush et al. |
| 8,359,538 | B2 | 1/2013 | Jyrinki |
| 8,407,075 | B2 | 3/2013 | Lance et al. |
| 8,423,088 | B2 | 4/2013 | Ickman et al. |
| 8,510,677 | B2 * | 8/2013 | van Os .................. G06F 3/0483 715/835 |
| 8,537,983 | B1 * | 9/2013 | Haggerty ................ H04M 11/00 379/88.14 |
| 8,577,959 | B2 | 11/2013 | Pandey et al. |
| 8,712,820 | B2 | 4/2014 | Gingras et al. |
| 8,745,141 | B2 | 6/2014 | Rosenberg et al. |
| 8,793,611 | B2 * | 7/2014 | van Os .................. G06Q 10/109 715/800 |
| 9,292,521 | B1 | 3/2016 | Goo et al. |
| 9,489,111 | B2 * | 11/2016 | van Os .................. G06F 3/0483 |
| 9,746,997 | B2 | 8/2017 | Joshi et al. |
| 2002/0186252 | A1 * | 12/2002 | Himmel .............. G06F 3/04855 715/787 |
| 2002/0196280 | A1 | 12/2002 | Bassett et al. |
| 2003/0225732 | A1 | 12/2003 | Chan et al. |
| 2004/0109137 | A1 | 6/2004 | Bubie et al. |
| 2004/0181425 | A1 | 9/2004 | Schwerin-Wenzel et al. |
| 2004/0268270 | A1 | 12/2004 | Hill et al. |
| 2005/0105374 | A1 | 5/2005 | Finke-Anlauff et al. |
| 2005/0108253 | A1 * | 5/2005 | Metsatahti ............ G06Q 10/109 |
| 2005/0182709 | A1 | 8/2005 | Belcsak et al. |
| 2005/0204309 | A1 * | 9/2005 | Szeto .................... G06F 3/0482 715/811 |
| 2005/0222971 | A1 | 10/2005 | Cary |
| 2005/0262450 | A1 | 11/2005 | Sauermann |
| 2005/0267975 | A1 | 12/2005 | Qureshi et al. |
| 2006/0020889 | A1 | 1/2006 | Coppinger et al. |
| 2006/0028917 | A1 * | 2/2006 | Wigginton ............ G04G 15/006 368/28 |
| 2006/0069604 | A1 | 3/2006 | Leukart et al. |
| 2006/0200372 | A1 | 9/2006 | O'Cull et al. |
| 2006/0236269 | A1 | 10/2006 | Borna |
| 2006/0265263 | A1 | 11/2006 | Burns |
| 2006/0279628 | A1 | 12/2006 | Fleming |
| 2007/0027938 | A1 | 2/2007 | Clarke |
| 2007/0038494 | A1 | 2/2007 | Kreitzberg et al. |
| 2007/0168892 | A1 | 7/2007 | Brush et al. |
| 2007/0182763 | A1 | 8/2007 | Venolia |
| 2007/0209019 | A1 | 9/2007 | Kaval et al. |
| 2007/0283247 | A1 | 12/2007 | Brenneman et al. |
| 2008/0016155 | A1 | 1/2008 | Khalatian |
| 2008/0016451 | A1 * | 1/2008 | Funabashi ........... G06F 3/04815 715/757 |
| 2008/0034047 | A1 * | 2/2008 | Rosenberg ........... G06Q 10/109 709/206 |
| 2008/0082925 | A1 * | 4/2008 | Brush .................. G06Q 10/109 715/744 |
| 2008/0109718 | A1 | 5/2008 | Narayanaswami |
| 2008/0134017 | A1 * | 6/2008 | Inoguchi ................ G06F 9/451 715/234 |
| 2008/0134041 | A1 | 6/2008 | Zinn |
| 2008/0141145 | A1 | 6/2008 | Klausmeier |
| 2008/0168050 | A1 | 7/2008 | Reyes et al. |
| 2008/0195452 | A1 | 8/2008 | Ponce de Leon |
| 2008/0195455 | A1 | 8/2008 | May et al. |
| 2008/0235072 | A1 | 9/2008 | Gupta et al. |
| 2008/0294663 | A1 | 11/2008 | Heinley et al. |
| 2008/0294994 | A1 | 11/2008 | Kruger et al. |
| 2008/0307323 | A1 | 12/2008 | Coffman et al. |
| 2009/0049123 | A1 * | 2/2009 | Dargahi ................ G06Q 10/00 709/203 |
| 2009/0063947 | A1 | 3/2009 | Anderson |
| 2009/0100347 | A1 * | 4/2009 | Schemers ............ G06Q 10/109 715/751 |
| 2009/0138307 | A1 | 5/2009 | Belcsak et al. |
| 2009/0157513 | A1 | 6/2009 | Bonev et al. |
| 2009/0193353 | A1 * | 7/2009 | Sharp .................... G06Q 10/06 715/784 |
| 2009/0196123 | A1 | 8/2009 | Gautam |
| 2009/0240611 | A1 | 9/2009 | Augustine et al. |
| 2009/0241048 | A1 | 9/2009 | Augustine et al. |
| 2009/0254825 | A1 * | 10/2009 | Sichart .................. G06F 16/248 715/716 |
| 2009/0281859 | A1 | 11/2009 | Isaacson |
| 2009/0292690 | A1 | 11/2009 | Culbert |
| 2010/0102982 | A1 | 4/2010 | Hoveida |
| 2010/0159967 | A1 * | 6/2010 | Pounds .................. H04L 1/14 455/466 |
| 2010/0223089 | A1 | 9/2010 | Godfrey et al. |
| 2010/0262926 | A1 | 10/2010 | Gupta et al. |
| 2010/0275148 | A1 | 10/2010 | Pan et al. |
| 2010/0313151 | A1 | 12/2010 | Wei et al. |
| 2010/0318398 | A1 | 12/2010 | Brun et al. |
| 2010/0332514 | A1 * | 12/2010 | Steele .................... G06F 7/02 707/769 |
| 2011/0071878 | A1 | 3/2011 | Gingras et al. |
| 2011/0105095 | A1 * | 5/2011 | Kedefors ............ H04M 1/72522 455/418 |
| 2011/0126150 | A1 | 5/2011 | Haynes et al. |
| 2011/0167369 | A1 | 7/2011 | Van Os |
| 2011/0184943 | A1 | 7/2011 | Norton et al. |
| 2011/0202866 | A1 | 8/2011 | Huang et al. |
| 2011/0202879 | A1 | 8/2011 | Stovicek et al. |
| 2011/0212711 | A1 * | 9/2011 | Scott .................... G06Q 10/109 455/414.2 |
| 2011/0239146 | A1 | 9/2011 | Dutta et al. |
| 2011/0252351 | A1 | 10/2011 | Sikora et al. |
| 2011/0283224 | A1 | 11/2011 | Ramsey et al. |
| 2011/0296312 | A1 | 12/2011 | Boyer et al. |
| 2012/0005261 | A1 | 1/2012 | Pandey et al. |
| 2012/0047421 | A1 | 2/2012 | Holman |
| 2012/0150784 | A1 | 6/2012 | Mital et al. |
| 2012/0215578 | A1 | 8/2012 | Swierz et al. |
| 2012/0262472 | A1 | 10/2012 | Garr et al. |
| 2012/0331378 | A1 | 12/2012 | Baioura |
| 2012/0331404 | A1 * | 12/2012 | Buford .................. G06Q 10/10 715/757 |
| 2013/0007648 | A1 | 1/2013 | Gamon et al. |
| 2013/0010575 | A1 | 1/2013 | He et al. |
| 2013/0018667 | A1 | 1/2013 | Nudd |
| 2013/0024206 | A1 | 1/2013 | Hughes et al. |
| 2013/0055106 | A1 | 2/2013 | Tarneberg et al. |
| 2013/0124990 | A1 | 5/2013 | Lettau |
| 2013/0151965 | A1 * | 6/2013 | Demiris ................ G11B 27/34 715/716 |
| 2013/0159198 | A1 | 6/2013 | Cartan et al. |

(56) References Cited

U.S. PATENT DOCUMENTS

| | | | |
|---|---|---|---|
| 2013/0159875 A1* | 6/2013 | Ahiakpor | G06Q 10/107 715/752 |
| 2013/0227462 A1* | 8/2013 | Hsu | G06Q 10/109 715/777 |
| 2013/0326401 A1* | 12/2013 | van Os | G06F 3/0483 715/802 |
| 2013/0335419 A1 | 12/2013 | Bondesen et al. | |
| 2014/0006938 A1 | 1/2014 | Black et al. | |
| 2014/0012574 A1 | 1/2014 | Pasupalak et al. | |
| 2014/0033025 A1 | 1/2014 | Mukherjee et al. | |
| 2014/0082536 A1 | 3/2014 | Costa et al. | |
| 2014/0101189 A1 | 4/2014 | Schenkel | |
| 2014/0104158 A1 | 4/2014 | Abdukalykov et al. | |
| 2014/0105492 A1 | 4/2014 | Das et al. | |
| 2014/0108333 A1 | 4/2014 | Jain et al. | |
| 2014/0129971 A1 | 5/2014 | King | |
| 2014/0156597 A1 | 6/2014 | Hakami et al. | |
| 2014/0157200 A1 | 6/2014 | Jeon | |
| 2014/0181126 A1 | 6/2014 | Nadj et al. | |
| 2014/0181928 A1 | 6/2014 | Bergman et al. | |
| 2014/0281967 A1 | 9/2014 | Bodnick et al. | |
| 2014/0304005 A1* | 10/2014 | Hughes | G06F 3/041 705/3 |
| 2014/0310045 A1 | 10/2014 | Meltzer et al. | |
| 2014/0343990 A1* | 11/2014 | Photowat | G06Q 10/1097 705/7.17 |
| 2014/0358613 A1 | 12/2014 | Libin | |
| 2014/0365107 A1 | 12/2014 | Dutta et al. | |
| 2015/0178260 A1 | 6/2015 | Brunson | |
| 2015/0205491 A1* | 7/2015 | Tahloe | G06F 3/04842 715/823 |
| 2015/0234903 A1 | 8/2015 | Mukai et al. | |
| 2015/0302531 A1 | 10/2015 | Thier et al. | |
| 2015/0347980 A1 | 12/2015 | White et al. | |
| 2015/0347983 A1 | 12/2015 | Jon et al. | |
| 2015/0370422 A1 | 12/2015 | Joshi et al. | |
| 2015/0370440 A1 | 12/2015 | Joshi et al. | |
| 2015/0370462 A1 | 12/2015 | Joshi et al. | |
| 2015/0370463 A1 | 12/2015 | Joshi et al. | |
| 2015/0370904 A1 | 12/2015 | Joshi et al. | |
| 2018/0357305 A1* | 12/2018 | Kinast | G06F 16/334 |
| 2019/0294631 A1* | 9/2019 | Alcantara | G06F 16/743 |

OTHER PUBLICATIONS

"Second Written Opinion Issued in PCT Application No. PCT/US2015/036571", dated May 17, 2016, 6 Pages.
"International Preliminary Report on Patentability Issued in PCT Application No. PCT/US2015/036571", dated Sep. 22, 2016, 7 Pages.
"AEON Timeline", Published on: Jun. 10, 2012 Available at: http://www.scribblecode.com/release_support/AeonTimeline_UserManual.pdf.
"Exelon Enbeded DVR", Retrieved on: Aug. 18, 2014 Available at: http://austinsecurity.ca/downloads/custfiles/embedded/Exelon/Exelon%20Search%20and%20Archive.pdf.
"Searching by Calendar or Timeline", Retrieved on: Aug. 18, 2014 Available at: http://www.safaribooksonline.com/library/view/david-pogues digital/9780596156800/ch09s11.html.
"A Mashup using Google Calendar and Timeline", Published on: Dec. 31, 2008 Available at: http://campbell-lange.net/company/articles/googlemashup.
"Calie—Calendar for iPhone and iPad", Retrieved on: Aug. 18, 2014 Available at: http://www.blackburninternet.com/calie/index.php.
"Calendars", Retrieved on: Aug. 18, 2014 Available at: https://asana.com/guide/learn/projects/calendar.
"Calendar with Key Dates", Retrieved from<<https://web.archive.org/web/20120907090930/http://www.spreadsheetshoppe.com/calendar-key-dates-notes-at-bottom.html>>, Sep. 7, 2012, 3 Pages.
"DHTMLX JavaPlanner", Retrieved from <<http://web.archive.org/web/20130221042642/http:javaplanner.com/features.html>>, Feb. 21, 2013, 15 Pages.

"DHTMLX Scheduler .NET Documentation", Retrieved from<<http://web.archive.org/web/20160919032829/http://scheduler-net.com/docs>>, May 9, 2014, 3 Pages.
"Events", Google Calendar API-Google Developers, Retrieved on: Aug. 12, 2014, 8 Pages.
"Full Calendar: Animate an event", Retrieved from <<http://stackoverflow.com/questions/15877417/full-calendar-animate-an-event>>, Apr. 13, 2013, 8 Pages.
"How to Make a Timeline Online With Yahoo!", Retrieved from <<https://web.archive.org/web/20100803015018/http://www.ehow.com/how_6719273_make-timeline-online-yahoo_.html>>, Aug. 3, 2010, 3 Pages.
"Opera Dragonfly Documentation", Retrieved from <<https://web.archive.org/web/20130201233852/http://www.opera.com/dragonfly/documentation/profiler/>>, Feb. 1, 2013, 3 Pages.
"Performance Timeline", https://www.w3.org/TR/2013/PR-performance-timeline-20131031/>>, Oct. 31, 2013, 6 Pages.
"Scheduler GUI", Retrieved from <<http://web.archive.org/web/20140225044235/http://docs.dhtmlx.com/scheduler/user_interface.html>>, Feb. 25, 2014, 3 Pages.
"Time Flow Analytical Timeline Visual Timelines for Investigation", Retrieved from <<https://web.archive.org/web/20101002044144/http://github.com/FlowingMedia/TimeFlow/wiki>>, Oct. 28, 2010, 2 Pages.
"Using ADF Timeline Components", Retrieved from <<https://web.archive.org/web/20131025010316/http://docs.oracle.com/cd/E28280_01/web.1111/b31973/dv_timeline.htm>>, Oct. 25, 2013, 17 Pages.
"Welcome to dhtmlxScheduler", Retrieved from << http://web.archive.org/web/20140223134212/http://docs.dhtmlx.com/scheduler>>, Feb. 23, 2014, 1 Page.
"WinForms Schedule Control Quick Start Guide", Retrieved from <<http://www.devcomponents.com/kb2/?p=404>>, Jul. 25, 2011, 32 Pages.
"Non-Final Office Action Issued in U.S. Appl. No. 14/518,425", dated Sep. 15, 2016, 30 Pages.
"Non-Final Office Action Issued in U.S. Appl. No. 14/518,824", dated Dec. 30, 2016, 24 Pages.
"Final Office Action Issued in U.S. Appl. No. 14/519,089", dated Sep. 13, 2016, 35 Pages.
"Non-Final Office Action Issued in U.S. Appl. No. 14/519,089", dated Jun. 16, 2016, 29 Pages.
"Non-Final Office Action Issued in U.S. Appl. No. 14/520,293", dated Mar. 9, 2017, 20 Pages.
Batrinca, et al., "A Timeline Visualization for Multi-Team Collaborative Planning", In Proceedings of the Extended Abstracts on Human Factors in Computing Systems, Apr. 27, 2013, pp. 157-162.
Byrne, et al., "Chapter 11—Searching Outlook Data", In Book Programming Applications for Microsoft Office Outlook, Feb. 28, 2007, 34 Pages.
Gear, Adeline, "ZenDay, an Efficient Time Management App with a 3D Interface", Retrieved from<<http://theapptimes.com/zenday-an-efficient-time-management-app-with-a-3d-interface/>>, May 24, 2013, 5 Pages.
Gkekas, et al., "A Smart Calendar Application for Mobile Environments", In Proceedings of the 3rd International Conference on Mobile Multimedia Communications, Aug. 27, 2007, 5 Pages.
Jong, et al., "Timeline Documentation", Retrieved from<<http://almende.github.io/chap-links-library/js/timeline/doc/>>, Jul. 16, 2014, 15 Pages.
Liu, et al., "A Temporal Reasoning based Social Calendar Framework", In International Journal of Multimedia and Ubiquitous Engineering, vol. 9, Issue 5, Aug. 12, 2014, pp. 273-280.
Ocull, Heather, "Timelines Everywhere: See and Share your Work with Ease in SharePoint and PWA", Retrieved from <<https://web.archive.org/web/20140215211531/http://blogs.office.com/2012/09/07/timelines-everywhere-see-and-share-your-work-with-ease-in-sharepoint-and-pwa/>>, Sep. 7, 2012, 11 pages.
"International Search Report & Written Opinion Issued in PCT Application No. PCT/US2015/036561", dated Oct. 26, 2015, 9 Pages.
"International Preliminary Report on Patentability Issued in PCT Application No. PCT/US2015/036563", dated Oct. 6, 2016, 7 Pages.

(56) References Cited

OTHER PUBLICATIONS

"International Search Report & Written Opinion Issued in PCT Application No. PCT/US2015/036563", dated Sep. 11, 2015, 9 Pages.
"Second Written Opinion Issued in PCT Application No. PCT/US2015/036563", dated Jun. 1, 2016, 6 Pages.
"International Search Report & Written Opinion Issued in PCT Application No. PCT/US2015/036564", dated Sep. 11, 2015, 10 pages.
"International Search Report & Written Opinion Issued in PCT Application No. PCT/US2015/036565", dated Sep. 21, 2015, 9 Pages.
"International Preliminary Report on Patentability Issued in PCT Application No. PCT/US2015/036568", dated Sep. 22, 2016, 7 Pages.
"International Search Report & Written Opinion Issued in PCT Application No. PCT/US2015/036568", dated Dec. 11, 2015, 10 Pages.
"Second Written Opinion Issued in PCT Application No. PCT/US2015/036568", dated May 17, 2016, 6 Pages.
"International Preliminary Report on Patentability Issued in PCT Application No. PCT/US2015/036569", dated Oct. 6, 2016, 6 Pages.
"International Search Report and Written Opinion Issued in PCT Application No. PCT/US2015/036569", dated Oct. 8, 2015, 9 Pages.
"Second Written Opinion Issued in PCT Application No. PCT/US2015/036569", dated Jun. 1, 2016, 5 Pages.
"International Preliminary Report on Patentability Issued in PCT Application No. PCT/US2015/036570", dated Jul. 4, 2016, 6 Pages.
"International Search Report & Written Opinion Issued in PCT Application No. PCT/US2015/036570", dated Sep. 11, 2015, 9 Pages.
"Second Written Opinon Issued in PCT Application No. PCT/US2015/036570", dated Apr. 11, 2016, 5 Pages.
Thayer, et al., "I Love You, Let's Share Calendars: Calendar Sharing as Relationship Work", In Proceedings of the ACM Conference on Computer Supported Cooperative Work, Feb. 11, 2012, pp. 749-758.
Valerie, "Wrike Adds Recurring Tasks Feature to All Accounts for Free", Retrieved from <<https://web.archive.org/web/20100106182058/http://www.wrike.com/blog/12/16/2009/Wrike-Adds-Recurring-Tasks-Feature-to-All-Accounts-For-Free>>, Dec. 16, 2009, 3 Pages.
Vascellari, Andrea, "How to Use Google Calendar as a Project Management Tool", Retrieved from <<http://lifehacker.com/5918676/how-to-use-google-calendar-as-aproject-management-tool>>, Jun. 15, 2012, 7 Pages.
"Non-Final Office Action Issued in U.S. Appl. No. 14/518,515", dated Apr. 12, 2017, 32 Pages.
Price, David, "iOS 7 Safari tips: How to access iOS 7's new web features", Retrieved from: http://www.macworld.co.uk/news/apple/ios-7-safari-tips-how-access-ios-7s-new-web-features-3470866/, Oct. 2013, 7 Pages.
"Final Office Action Issued in U.S. Appl. No. 14/494,404", dated Jul. 27, 2017, 40 Pages.
"Non Final Office Action Issued in U.S. Appl. No. 14/494,404", dated Apr. 20, 2017, 33 Pages.
"Final Office Action Issued in U.S. Appl. No. 14/518,425", dated Jun. 15, 2017, 31 Pages.
"Final Office Action Issued in U.S. Appl. No. 14/518,425", dated Feb. 16, 2018, 37 Pages.
"Non Final Office Action Issued in U.S. Appl. No. 14/518,425", dated Jul. 3, 2018, 44 Pages.
"Non Final Office Action Issued in U.S. Appl. No. 14/518,425", dated Sep. 7, 2017, 32 Pages.
"Final Office Action Issued in U.S. Appl. No. 14/518,515", dated Sep. 7, 2017, 41 Pages.
"Final Office Action Issued in U.S. Appl. No. 14/518,824", dated Jun. 30, 2017, 19 Pages.
"Final Office Action Issued in U.S. Appl. No. 14/519,035", dated Sep. 1, 2017, 64 Pages.
"Non Final Office Action Issued in U.S. Appl. No. 14/519,035", dated May 17, 2017, 51 Pages.
"Final Office Action Issued in U.S. Appl. No. 14/520,293", dated Sep. 18, 2017, 24 Pages.
Mann, et al., "W3C; Performance Timeline W3C Proposed Recommendation", Retrieved from: https://www.w3.org/TR/2013/PR-performance-timeline-20131031/, Oct. 31, 2013, 6 Pages.
"Final Office Action Issued in U.S. Appl. No. 14/518,425", dated Nov. 28, 2018, 37 Pages.
"Non Final Office Action Issued in U.S. Appl. No. 14/519,035", dated Nov. 15, 2018, 75 Pages.
"First Office Action and Search Report Issued in Chinese Patent Application No. 201580033143.5", dated Dec. 29, 2018, 15 Pages.
"Non Final Office Action Issued in U.S. Appl. No. 14/518,425", dated Mar. 21, 2019, 34 Pages.
"Final Office Action Issued in U.S. Appl. No. 14/519,035", dated Jul. 5, 2019, 73 Pages.
"Office Action Issued in European Patent Application No. 15733972.2", dated Feb. 22, 2019, 7 Pages.
"Second Office Action and Search Report Issued in Chinese Patent Application No. 201580033143.5", dated Aug. 1, 2019, 16 Pages.
"Context Menu—Wikipedia, the free Encyclopedia", Retrieved From https://en.wikipedia.org/w/index.php?%20title=Context_menu&oldid=66576229, Jul. 26, 2006, 1 Pages.
"Office Action Issued In European Patent Application No. 15736089.2", dated Oct. 7, 2019, 10 Pages.
"Third Office Action and Search Repori Issued in Chinese Patent Application No. 201580033143.5", dated Dec. 3, 2019, 11 Pages.
Brown, et al., "Lotus Notes—Domino", Jan. 1, 2001, pp. 75-79.
"Context Menu—Wikipedia, the free Encyclopedia", Retrieved From https://en.wikipedia.org/w/index.php?%20title=Context_menu&oldid=66576229, Jul. 26, 2006, 1 Page.

* cited by examiner

LOCATING EVENT ON TIMELINE

RELATED APPLICATIONS

This applications claims the benefit of U.S. Provisional Patent Application Ser. No. 62/015,350 filed on Jun. 20, 2014. The disclosure of the provisional application is incorporated herein in its entirety.

BACKGROUND

Legacy calendar views in scheduling applications provide limited information. Alternatively, the legacy calendar views in scheduling applications provide excessive information. Legacy calendar views are usually used in detailed configurations for daily and weekly actions. However, users are underserved in long term synapsis of associated actions in legacy calendar views. Addition of actions and other items into legacy calendar views prove challenging for long term synapsis of associated actions.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to locating an event on a timeline. A calendar application may locate an event on a timeline by detecting a selection action on an event on a calendar. A context menu may be displayed on the calendar, where the context menu may include a search control. An activation of the search control may be detected. The event may be located on a timeline of the calendar. The event may be displayed on the timeline.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, locating an event on a timeline is provided. A calendar application may locate an event on a timeline by detecting a selection action on an event on a calendar. A context menu may be displayed on the calendar, where the context menu may include a search control. An activation of the search control may be detected. The event may be located on a timeline of the calendar. The event may be displayed on the timeline.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable memory device includes a hardware device that includes a hard disk drive, a solid state drive, a compact disk, a memory chip, among others. The computer-readable storage medium can for example be implemented via one or more of a volatile computer memory, a non-volatile memory, a hard drive, and a flash drive.

Throughout this specification, the term "platform" may be a combination of software and hardware components to locate an event on a timeline. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

Figure 1:
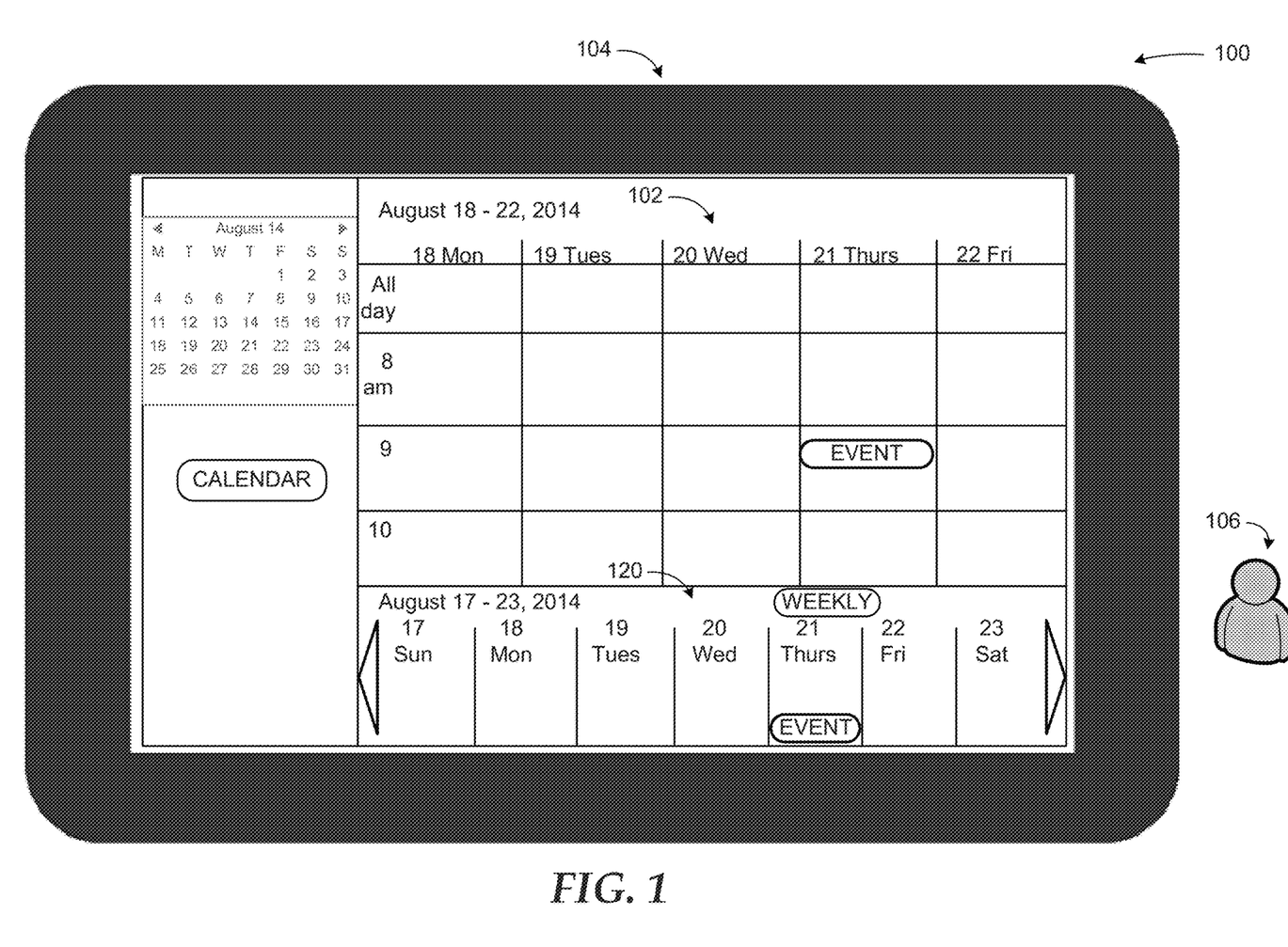
FIG. 1 is a conceptual diagram illustrating an example of locating an event on a timeline, according to embodiments.

FIG. 1 is a conceptual diagram illustrating an example of locating an event on a timeline, according to embodiments.

In a diagram 100, a computing device 104 may execute a calendar application 102. The computing device may include a tablet device, a laptop computer, a desktop computer, a smart phone, among others. The computing device 104 may display the calendar application 102 to a user 106. The user 106 may be allowed to interact with the calendar application 102 through an input device or touch enabled display component of the computing device 104. The user 106 may interact with the calendar application 102 with a keyboard based input, a mouse based input, a voice based input, a pen based input, a gesture based input, among others. The gesture based input may include one or more touch based actions such as a touch action, a swipe action, a combination of each, among others.

The calendar application 102 may include a timeline 120 as a component. The timeline may be displayed adjacent to and below a calendar. The timeline 120 may also be displayed as a stand-alone component. The timeline 120 may include a linear presentation of events during a time period divided based on a time unit such as a day. Events presented on the timeline may be duplicates of the events on a calendar displayed by the calendar application 102. A user 106 may be allowed to interact with the calendar and the timeline 120 to locate an event.

While the example system in FIG. 1 has been described with specific components including the computing device 104, the calendar application 102, the timeline 120, embodiments are not limited to these components or system configurations and can be implemented with other system configuration employing fewer or additional components.

Figure 2:
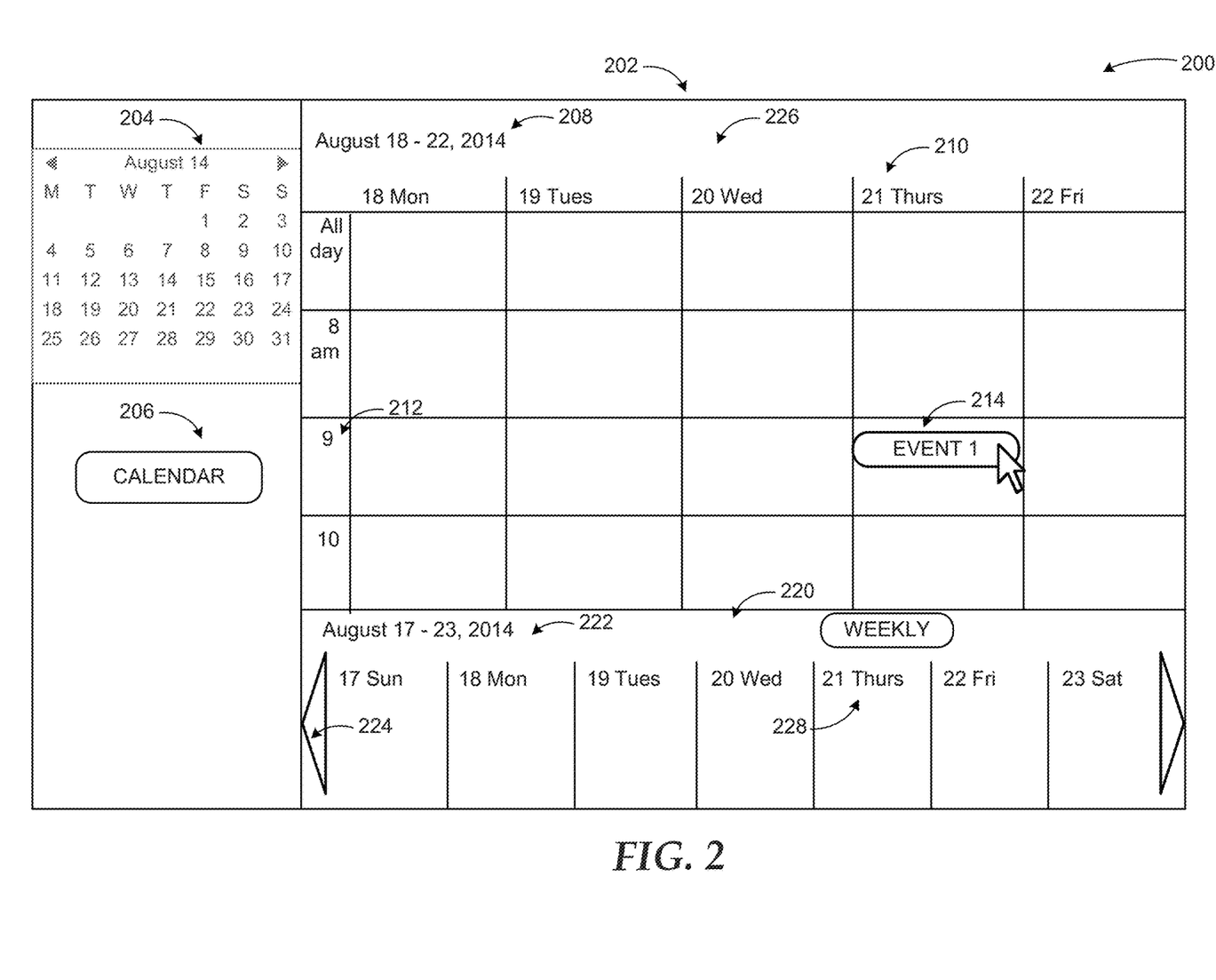
FIG. 2 illustrates an example of selecting an event on a timeline, according to embodiments.

FIG. 2 illustrates an example of selecting an event on a timeline, according to embodiments.

In a diagram 200, a calendar application 202 that displays a calendar 226 and a timeline 220 may be described. The calendar application 202 may display one or more components to manage events on the calendar 226 and the timeline 220. One of the components may include a date selection control 204. The date selection control 204 may allow a user to select a date from a displayed range. The selected date may be displayed in the calendar 226 within a date range that is configurable. The date range of the calendar 226 may include a day, a week, a month, a year, among others. A current date range may be illustrated with a date range label 208. The date range may also be partitioned vertically based on a time unit such as a day 210. The time units may be scrollable. The calendar 226 may also be partitioned horizontally based on an hour based unit 212. The hour based units may be scrollable. An "all day" unit may persist on a top section of the calendar 226 to show one or more events that last during a time unit such as a day. The calendar 226 may be selectable through a calendar selection control 206. The calendar application 202 may display one or more calendars that may be selectable through the calendar selection control 206 and other calendar selection controls displayed adjacent to the calendar selection control 206.

The timeline 220 may display a linear presentation of events on the calendar 226. The timeline 220 may display events that may be scrollable through a scroll control 224. A date range of the events may be presented with a date range label 222. The date range may be partitioned based on time units such as an hour, a day 228, a week, a month, a year, among others. The date range may be selectable based on a selection of the range by a user through a range selection control such as "weekly," among others. An event 214 on the calendar 226 of the calendar application 202 may also be duplicated as an event on the timeline 220.

The calendar application 202 may detect a selection action on the event 214 on the calendar 226. The selection action on the event 214 may include actions registered through a mouse input such as a click event, a touch based event such as a tap action, a swipe action, among others. The calendar application 202 may identify the selection action from a swipe action, a tap action, and a double-tap action from non-selection actions such as a tap and hold action and a scroll action.

Figure 3:
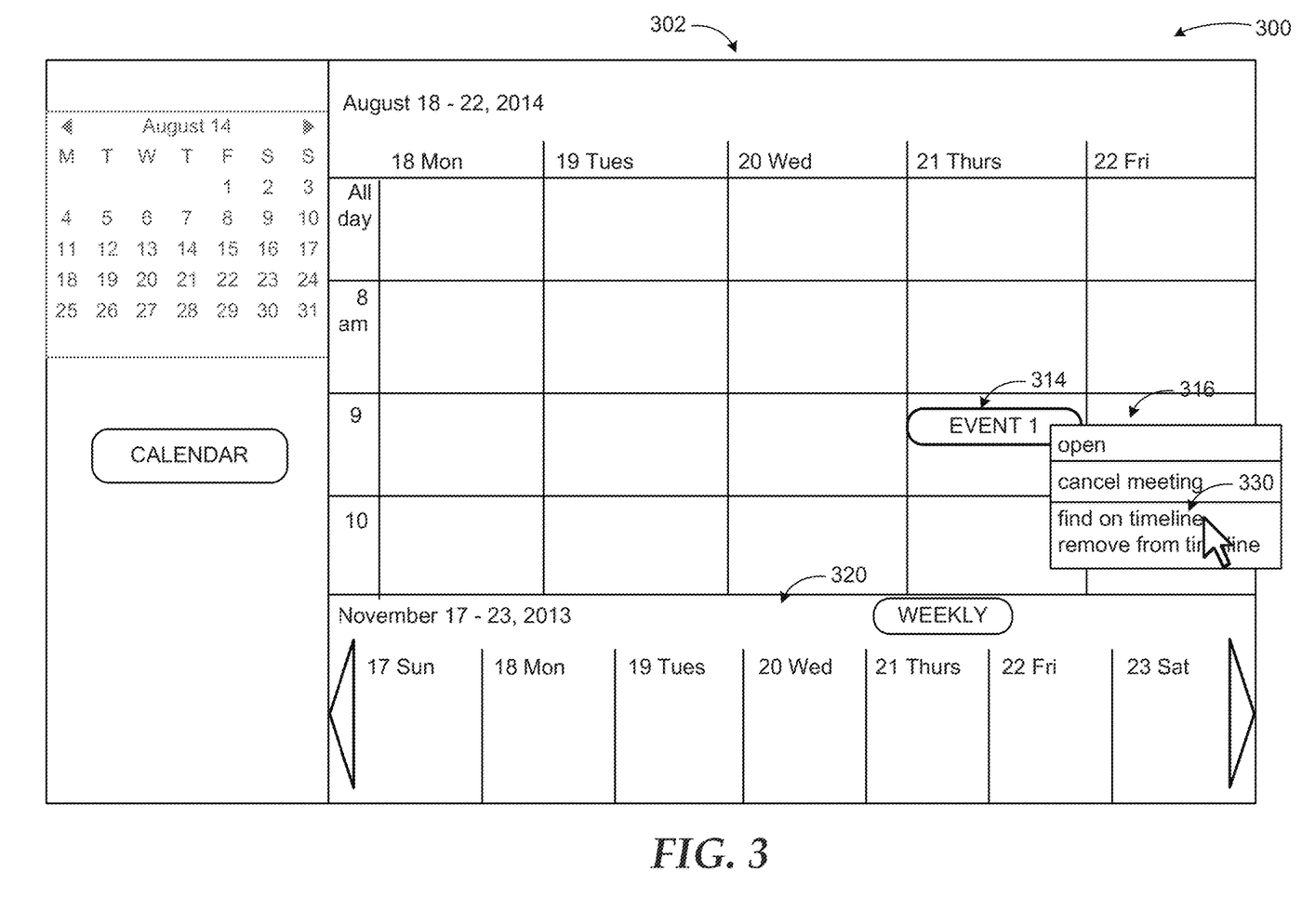
FIG. 3 illustrates an example of locating an event on a timeline with a context menu, according to embodiments.

FIG. 3 illustrates an example of locating an event on a timeline with a context menu, according to embodiments.

In a diagram 300, a calendar application 302 may display a context menu 316 in response to detecting a selection action on an event 314 on a calendar. The context menu 316 may be displayed in a location that is in proximity to the event 314, adjacent to the event 314, or superimposed on the event 314.

The context menu may include a search control. An activation 330 of the search control may be detected by the calendar application 302. In response to the activation 330, the timeline 320 may be scrolled to a date range that includes a date of the event 314. The duplicate of the event 314 on the timeline may be located within the date range. The duplicate event may be displayed on the timeline 320.

The context menu 316 may also provide a recurring event control. The recurring event control may provide an operation to create a recurring event from the event 314 on the calendar. In response to detecting an activation of the recurring event control, a recurring event may be created from the event 314 based on input provided to define attributes of the recurring event. The recurring event may include one or more occurrences of the event 314 at different timeslots based on the attributes of the recurrent event. The attributes of the recurring event may include a period of recurrence of the event, a start date of the recurring event, an end date of the recurring event, or a number of recurrence of the recurring event. The recurring event may also be duplicated on the timeline 320. The timeline may be scrolled to a time period that includes a start date associated with the recurring event.

The context menu 316 may also provide a delete control. In response to an activation of the delete control a duplicate of the event 314 on the timeline may be removed from the timeline.

Figure 4:
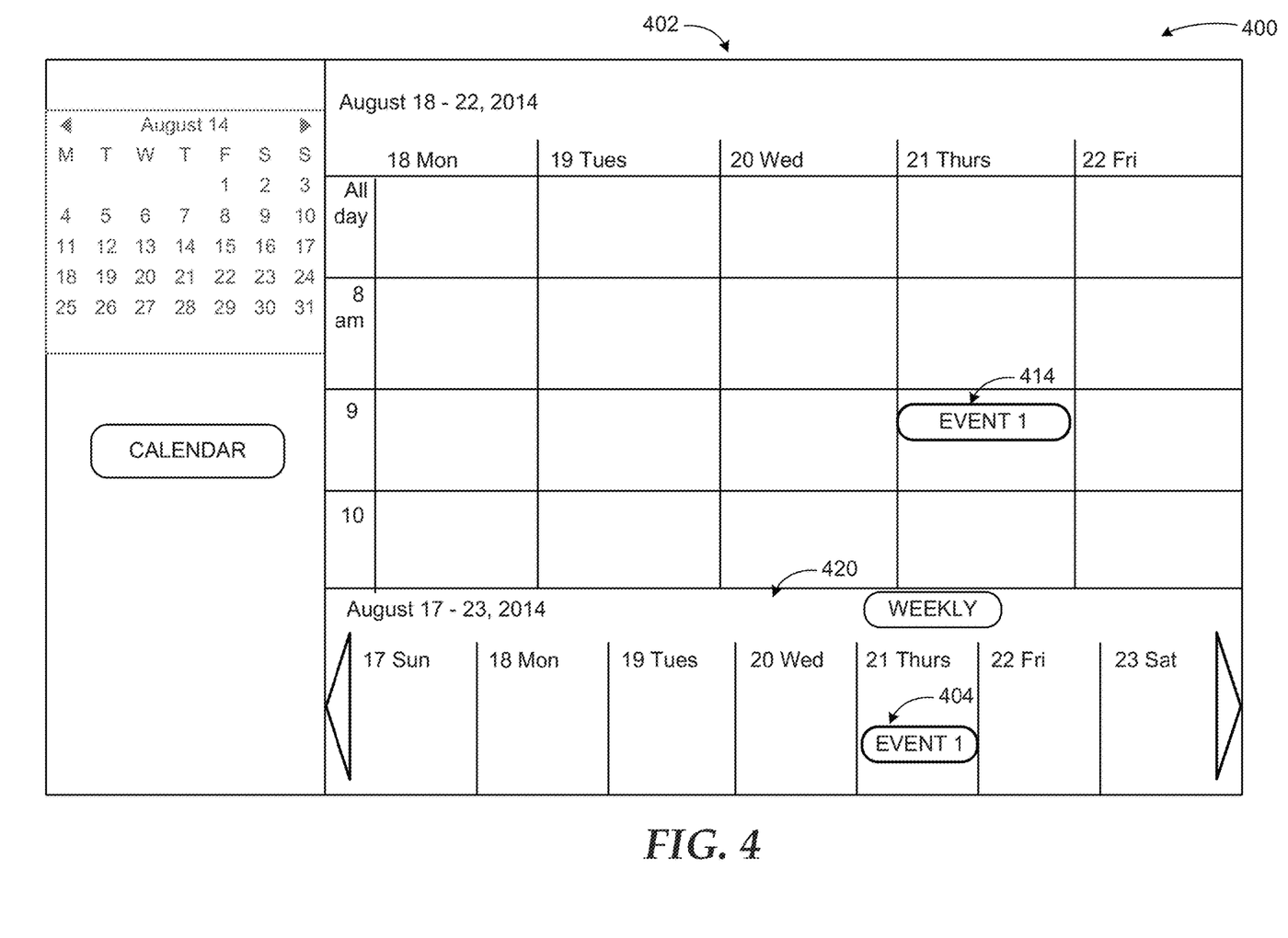
FIG. 4 illustrates an example of locating the event on the timeline associated with the calendar, according to embodiments.

FIG. 4 illustrates an example of locating the event on the timeline associated with the calendar, according to embodiments.

In a diagram 400, a calendar application 402 may locate an event 414 within a timeline 420. The timeline may be scrolled to a date range that includes a date of the event 414 on the calendar, in response to an activation of a search control on a context menu associated with the event 414 on the calendar. The event 404 may be displayed on the timeline 420 as a duplicate of the event 414 on the calendar.

Figure 5:
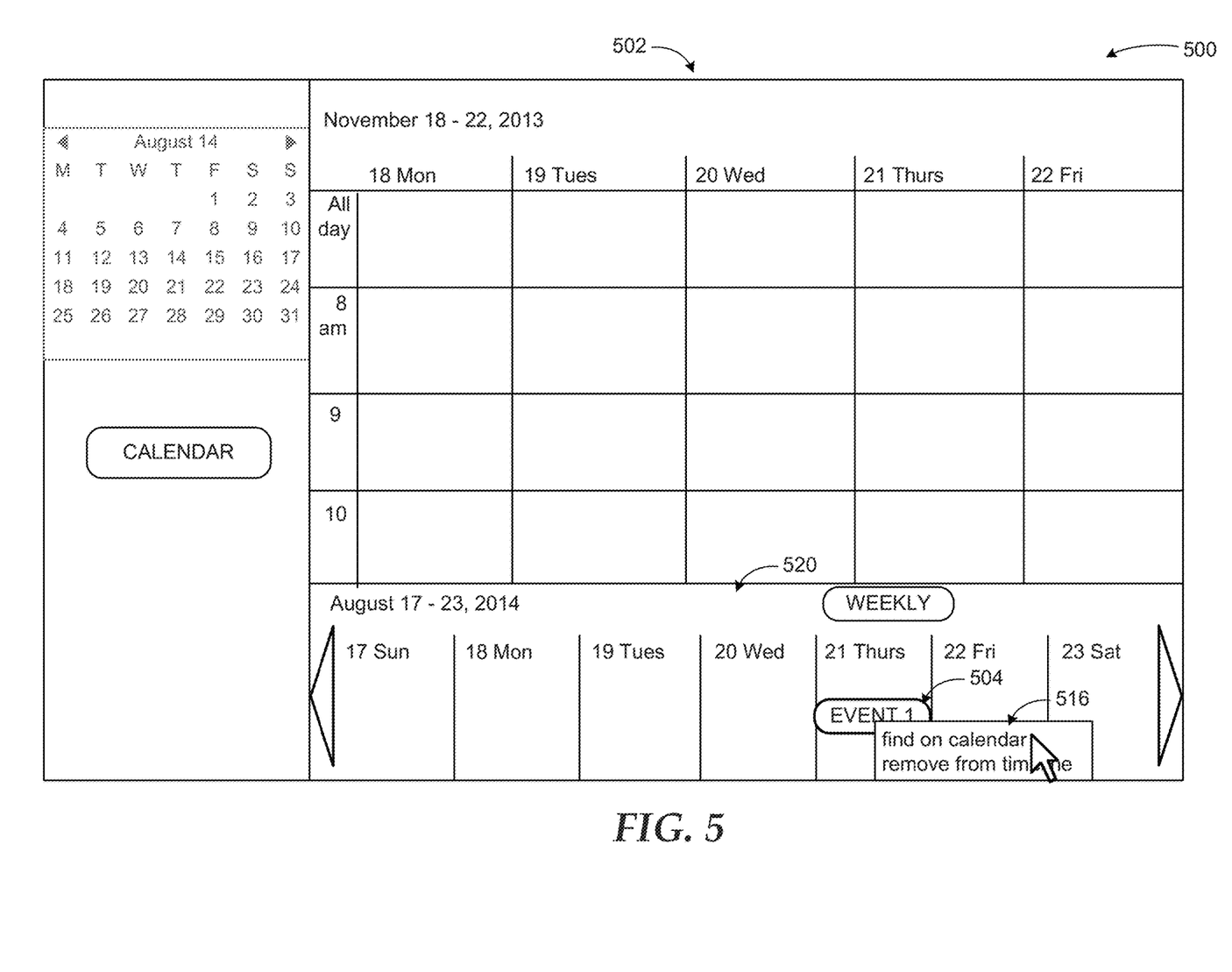
FIG. 5 illustrates an example of locating an event on a timeline, according to embodiments.

FIG. 5 illustrates an example of locating an event on a timeline, according to embodiments.

In a diagram 500, a calendar application 502 may display an event 504 on a timeline 520. A selection action may be detected on the event 504. In response to the selection action, a context menu 516 may be displayed in a location that is in proximity to, adjacent to, or superimposed on the event 504. The context menu 516 may include a search control and a delete control. In response to an activation of the search control, the calendar may be scrolled to a date range that includes a date of the event 504 to locate a duplicate of the event 504 on the calendar.

In response to an activation of the delete control, the event 504 may be removed from the timeline. The event on the calendar that matches the event 504 may not be removed from the calendar using the delete control in the context menu 516 without further input.

Figure 6:
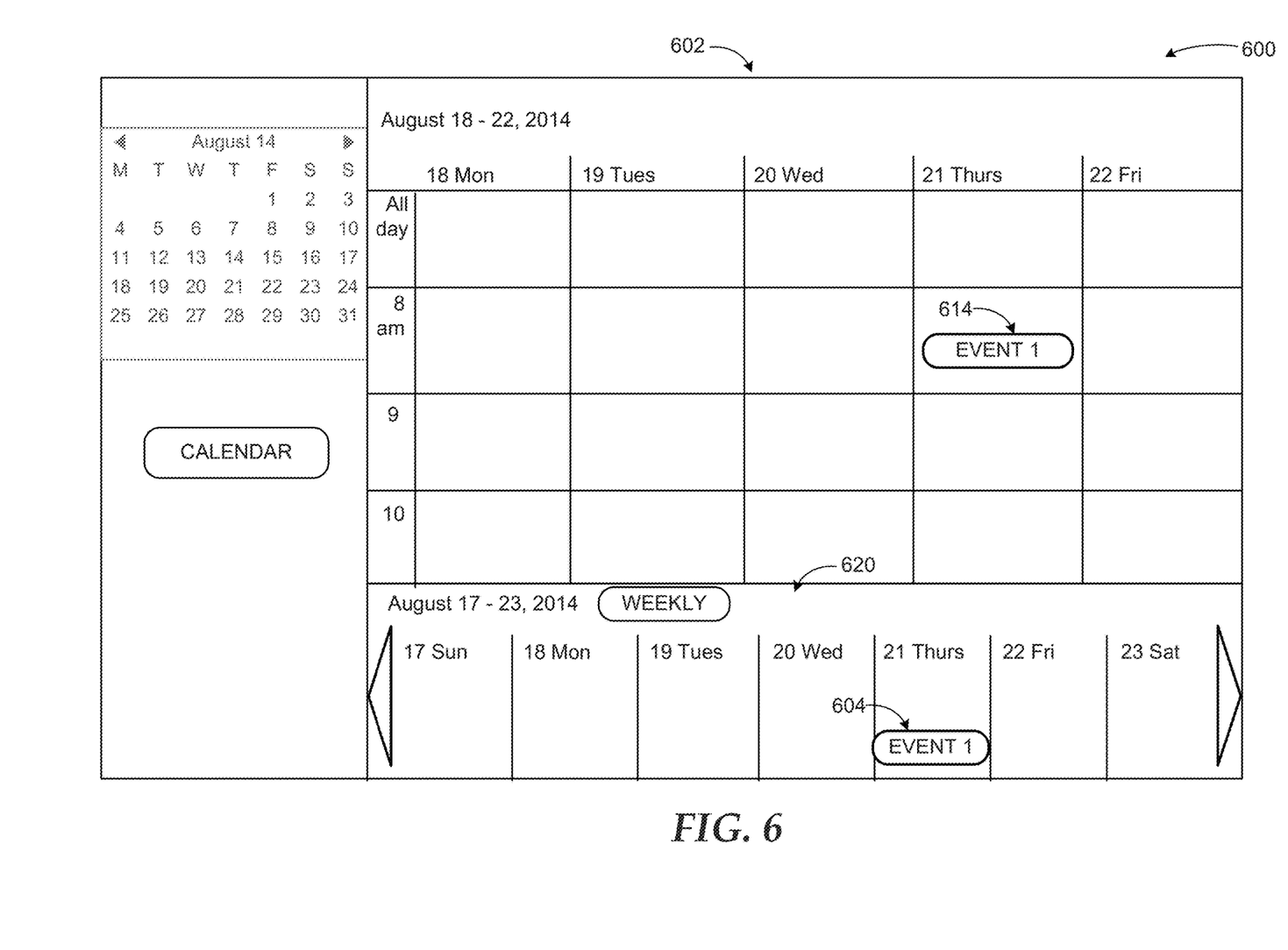
FIG. 6 illustrates another example of locating the event on the calendar, according to embodiments.

FIG. 6 illustrates another example of locating the event on the calendar, according to embodiments.

In a diagram 600, a calendar application 602 may display an event 614 on the calendar. The event 614 on the calendar may be located by selecting the event 604 on a timeline 620 to initiate a context menu that provides a search control to locate the event 614. In response to an activation of the search control associated with the event 604 on the timeline 620, the calendar may be scrolled to a date range that includes a date of the event 604. The event 614 that is a duplicate of the event 604 may be located in the date range and displayed on the calendar.

Figure 7:
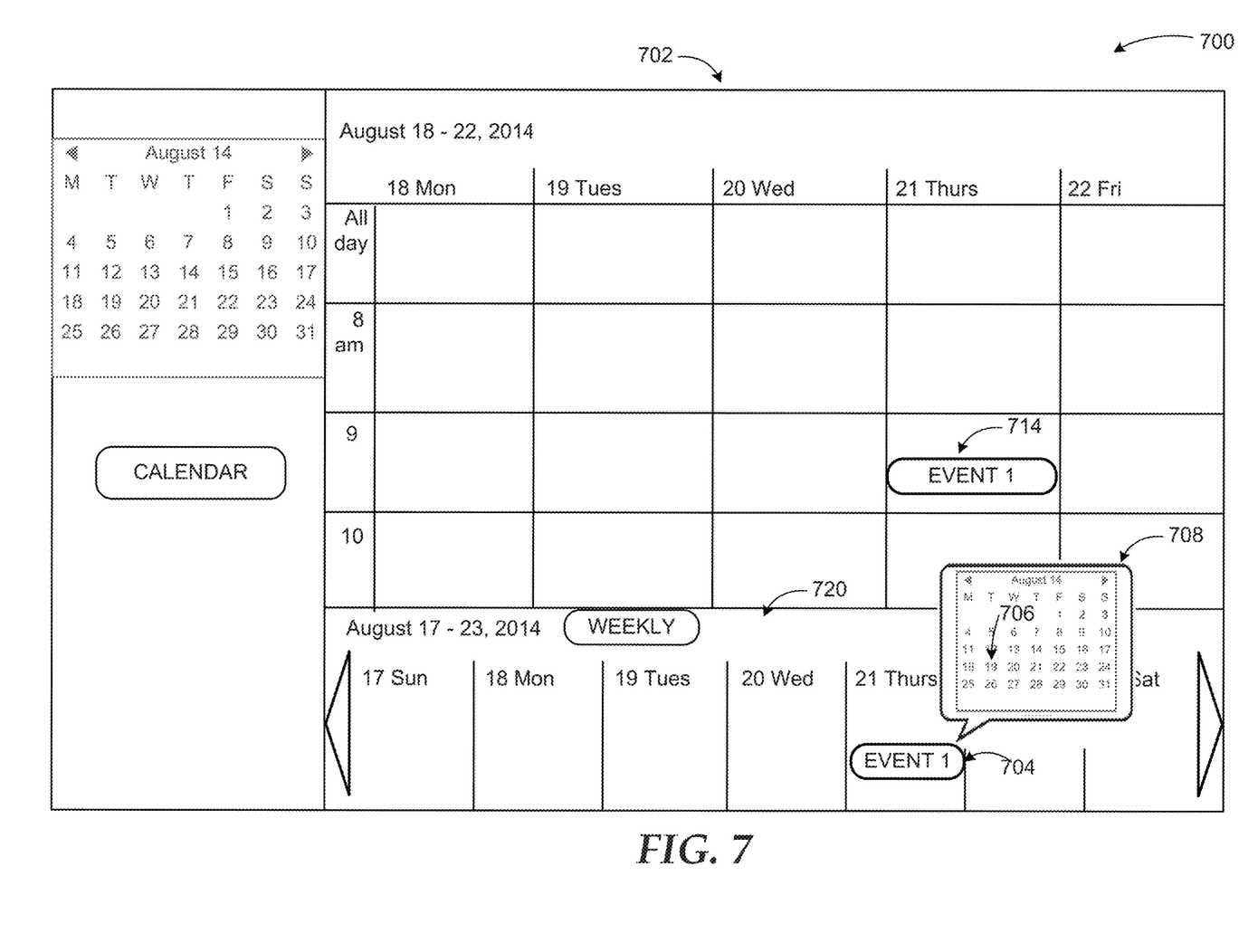
FIG. 7 illustrates an example of changing a date of an event on the timeline, according to embodiments.

FIG. 7 illustrates an example of changing a date of an event on the timeline, according to embodiments.

In a diagram 700, a calendar application 702 may detect a select and hold action on the event 704. The select and hold action may include a continued selection action such as a touch a hold action of a touch based input or a click and hold action of a mouse based input. A calendar control 708 may be displayed in a location that is in proximity to, adjacent to, or superimposed on the event 704. The calendar control 708 may be displayed to change a date of the event 704 on the timeline.

A new date 706 selected on the calendar control may be detected. In response to the new date 706, the event 704 may be moved to the new date on the timeline 720. An event 714 on the calendar that is a duplicate of the event 704 may also be moved to the new date 706. Alternatively, an additional input may be requested to move the event 714 on the calendar.

The technical advantage of locating an event on a timeline may include improved usability and enhanced reliability of display devices in event locating, management, and display, among other features compared to static event presentation based solutions.

The example scenarios and schemas in FIG. 1 through 7 are shown with specific components, data types, and configurations. Embodiments are not limited to systems according to these example configurations. Locating an event on a timeline may be implemented in configurations employing fewer or additional components in applications and user interfaces. Furthermore, the example schema and components shown in FIG. 1 through 7 and their subcomponents may be implemented in a similar manner with other values using the principles described herein.

Figure 8:
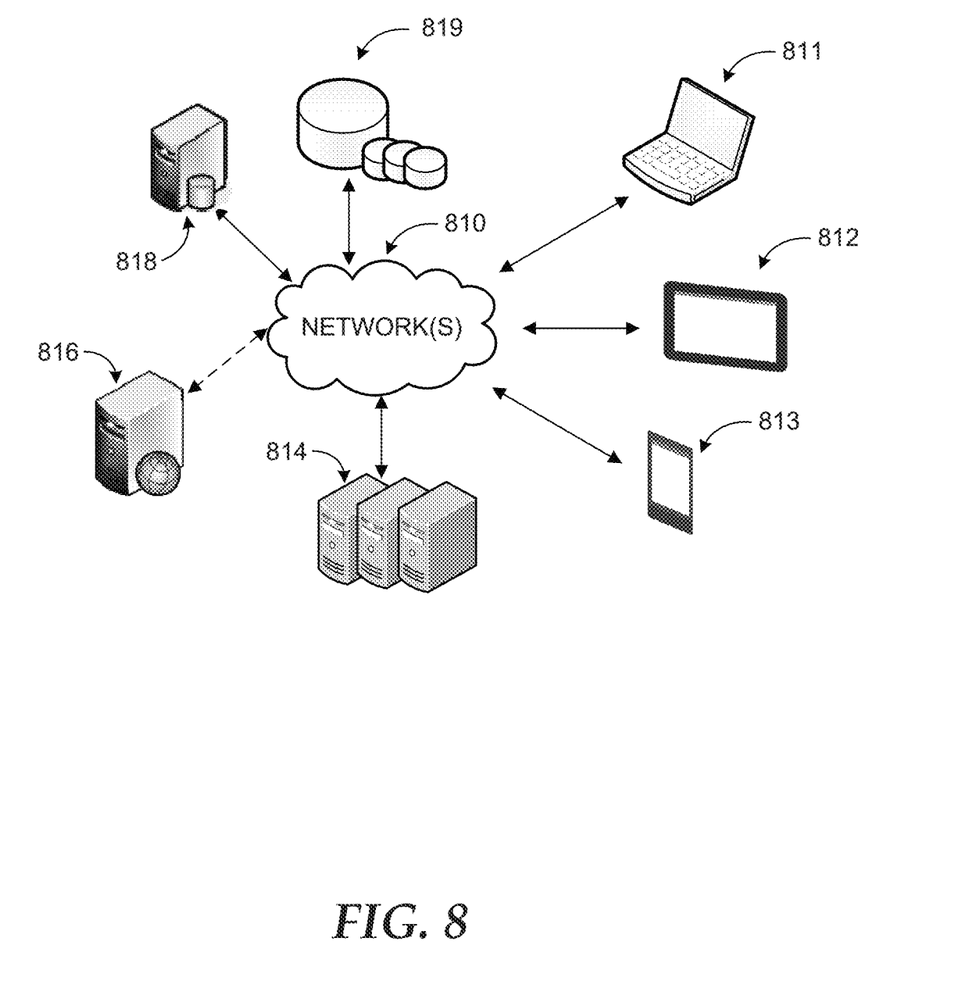
FIG. 8 is an example of a simplified networked environment, where a system according to embodiments may be implemented.

FIG. 8 is an example of a simplified networked environment, where a system according to embodiments may be implemented.

A calendar application may be configured to locate an event on a timeline. The calendar application may be implemented via software executed over one or more servers 814 such as a hosted service. The platform may communicate with client applications on individual computing devices such as a smart phone 813, a laptop computer 812, or desktop computer 811 ('client devices') through network(s) 810.

Client applications executed on any of the client devices 811-813 may facilitate communications via application(s) executed by servers 814, or on individual server 816. A calendar application may display a context menu on the calendar, where the context menu includes a search control. The event may be located and displayed on the timeline of the calendar, in response to an activation of the search control. The calendar application may store data associated with the timeline in data store(s) 819 directly or through database server 818.

Network(s) 810 may comprise any topology of servers, clients, Internet service providers, and communication media. A system according to embodiments may have a static or dynamic topology. Network(s) 810 may include secure networks such as an enterprise network, an unsecure network such as a wireless open network, or the Internet. Network(s) 810 may also coordinate communication over other networks such as Public Switched Telephone Network (PSTN) or cellular networks. Furthermore, network(s) 810 may include short range wireless networks such as Bluetooth or similar ones. Network(s) 810 provide communication between the nodes described herein. By way of example, and not limitation, network(s) 810 may include wireless media such as acoustic, RF, infrared and other wireless media.

Many other configurations of computing devices, applications, data sources, and data distribution systems may be employed to locate an event on a timeline. Furthermore, the networked environments discussed in FIG. 8 are for illustration purposes only. Embodiments are not limited to the example applications, modules, or processes.

Figure 9:
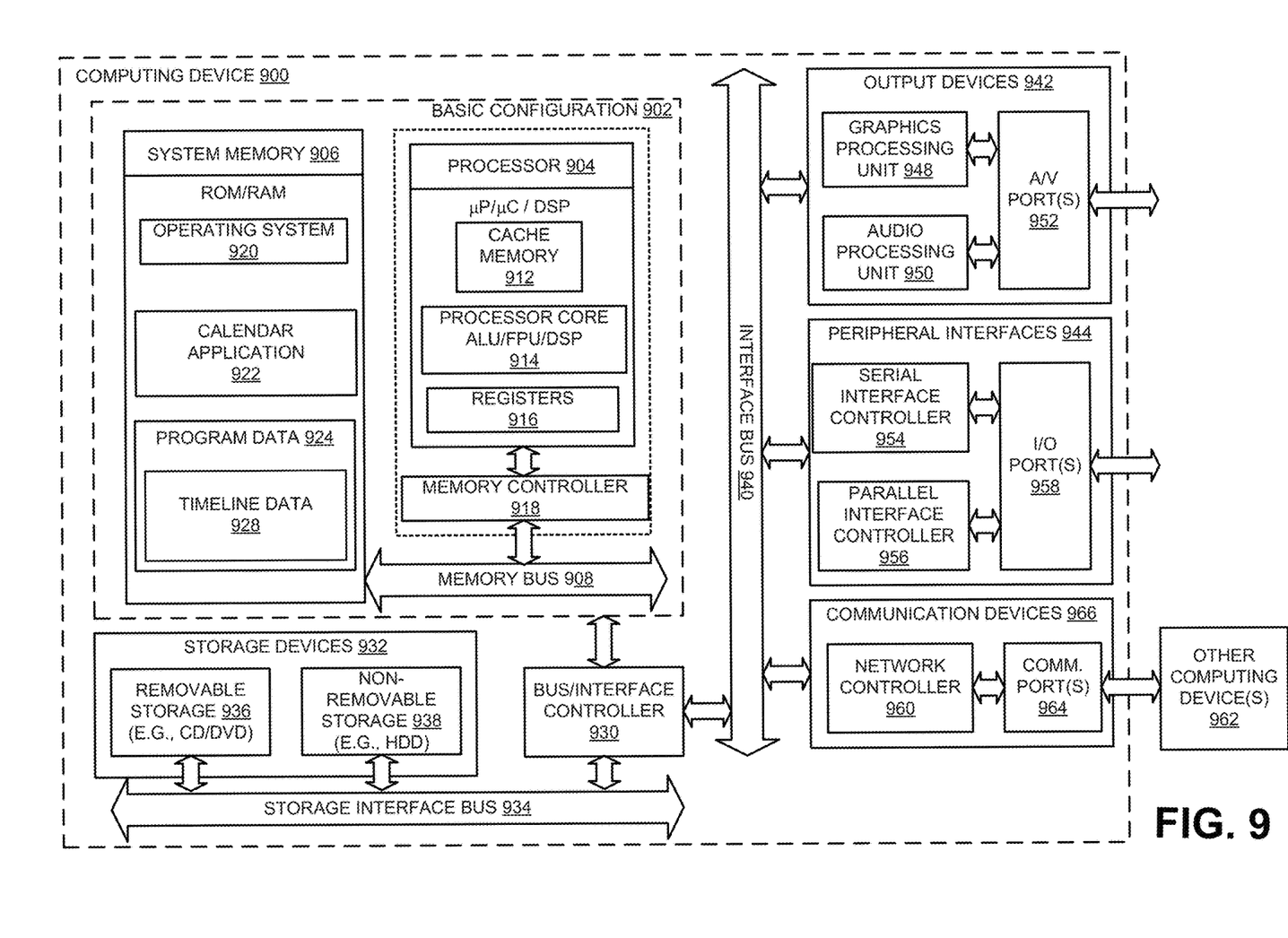
FIG. 9 illustrates a general purpose computing device, which may be configured to locate an event on a timeline.

FIG. 9 illustrates a general purpose computing device, which may be configured to locate an event on a timeline, arranged in accordance with at least some embodiments described herein.

For example, the computing device 900 may be used to locate an event on a timeline. In an example of a basic configuration 902, the computing device 900 may include one or more processors 904 and a system memory 906. A memory bus 908 may be used for communication between the processor 904 and the system memory 906. The basic configuration 902 may be illustrated in FIG. 9 by those components within the inner dashed line.

Depending on the desired configuration, the processor 904 may be of any type, including, but not limited to, a microprocessor (µP), a microcontroller (µC), a digital signal processor (DSP), or any combination thereof. The processor 904 may include one more levels of caching, such as a level cache memory 912, a processor core 914, and registers 916. The processor core 914 may include an arithmetic logic unit (ALU), a floating point unit (FPU), a digital signal processing core (DSP Core), or any combination thereof. A memory controller 918 may also be used with the processor 904, or in some implementations, the memory controller 918 may be an internal part of the processor 904.

Depending on the desired configuration, the system memory 906 may be of any type including but not limited to volatile memory (such as RAM), non-volatile memory (such as ROM, flash memory, etc.), or any combination thereof. The system memory 906 may include an operating system 920, a calendar application 922, and a program data 924. The calendar application 922 may locate an event on a timeline. The calendar application 922 may display a context menu on the calendar, where the context menu includes a search control. The event may be located and displayed on the timeline of the calendar, in response to an activation of the search control. Components of the calendar application 922 (such as a user interface) may also be displayed on a display device associated with the computing device 900. An example of the display device may include a hardware screen that may be communicatively coupled to the computing device 900. The display device may include a touch based device that detects gestures such as a touch action. The display device may also provide feedback in response to detected gestures (or any other form of input) by transforming one or more interfaces of the calendar application 922 such as the timeline and the calendar, displayed by the touch based device. The program data 924 may also include, among other data, a timeline data 928, or the like, as described herein. The timeline data 928 may include the event, subject name of the event, the event date, among others.

The computing device 900 may have additional features or functionality, and additional interfaces to facilitate communications between the basic configuration 902 and any desired devices and interfaces. For example, a bus/interface controller 930 may be used to facilitate communications between the basic configuration 902 and one or more data storage devices 932 via a storage interface bus 934. The data storage devices 932 may be one or more removable storage devices 936, one or more non-removable storage devices 938, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 906, the removable storage devices 936, and the non-removable storage devices 938 may be examples of computer storage media. Computer storage media may include, but may not be limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 900. Any such computer storage media may be part of the computing device 900.

The computing device 900 may also include an interface bus 940 for facilitating communication from various interface devices (for example, one or more output devices 942, one or more peripheral interfaces 944, and one or more communication devices 966) to the basic configuration 902 via the bus/interface controller 930. Some of the example output devices 942 may include a graphics processing unit 948 and an audio processing unit 950, which may be configured to communicate to various external devices, such as a display or speakers via one or more A/V ports 952. One or more example peripheral interfaces 944 may include a serial interface controller 954 or a parallel interface controller 956, which may be configured to communicate with external devices, such as input devices (for example, keyboard, mouse, pen, voice input device, touch input device, etc.) or other peripheral devices (for example, printer, scanner, etc.) via one or more I/O ports 958. An example communication device 966 may include a network controller 960, which may be arranged to facilitate communications with one or more other computing devices 962 over a network communication link via one or more communication ports 964. The one or more other computing devices 962 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 900 may be implemented as a part of a general purpose or specialized server, mainframe, or similar computer, which includes any of the above functions. The computing device 900 may also be implemented as a personal computer including both laptop computer and non-laptop computer configurations.

Example embodiments may also include locating an event on a timeline. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

Figure 10:
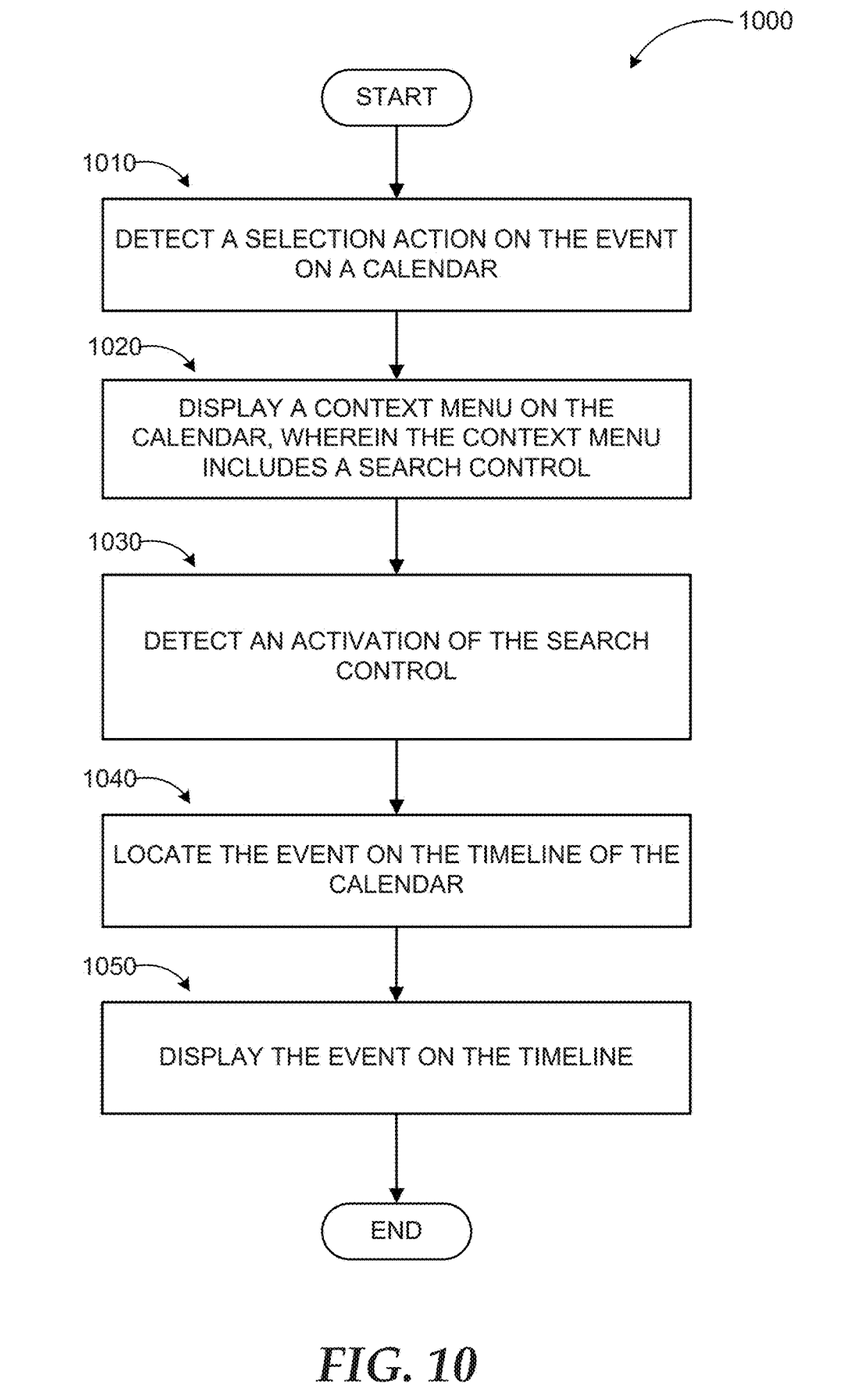
FIG. 10 illustrates a logic flow diagram for a process to locate an event on a timeline, according to embodiments.

FIG. 10 illustrates a logic flow diagram for a process to locate an event on a timeline, according to embodiments.

Process 1000 may be implemented on a calendar application of a cloud based service. Process 1000 begins with operation 1010, where a selection action may be detected on the event on a calendar. At operation 1020, a context menu may be displayed on the calendar where the context menu includes a search control. The context menu may include a search control. At operation 1030, an activation of the search control may be detected. At operation 1040, the event may be located on the timeline of the calendar. At operation 1050, the event may be displayed on the timeline.

The operations included in process 1000 are for illustration purposes. A calendar application according to embodiments may be implemented by similar processes with fewer or additional steps, as well as in different order of operations using the principles described herein.

According to some examples, a method that is executed on a computing device to locate an event on a timeline may be described. The method may include detecting a selection action on the event on a calendar, displaying a context menu on the calendar, where the context menu includes a search control, detecting an activation of the search control, locating the event on the timeline of the calendar, and displaying the event on the timeline.

According to other examples, the method may further include highlighting a current date on the timeline in response to detecting the event within a date range that includes the current date. The event on the calendar may be highlighted through an animation that includes one from a set of: a blinking animation applied to the event, a rotating animation applied to the event, a fade in animation applied to the event, and an animated object that encompasses the event. The context menu may be placed in one or more from a set of: proximity to the event, adjacent to the event, and superimposed on the event.

According to further examples, the method may further include detecting a second selection action on another event displayed on the timeline, displaying another context menu on the timeline that includes another search control, detecting an activation of the other search control, locating the other event on the calendar associated with the timeline, and displaying the other event on the calendar. The method may further include detecting an activation of a recurring event control on the context menu, where the recurring event control executes an operation to create a recurring event from the event on the calendar, duplicating the recurring event on the timeline, and scrolling to a time period within the timeline that includes a start date associated with the recurring event.

According to further examples, the method may further include detecting a select and hold action on the event on the timeline, displaying a calendar control to change a date of the event on the timeline, detecting a new date selected on the calendar control, and moving the event on the timeline to the new date. The method may further include detecting a second selection action on the event on the timeline, displaying another context menu on the timeline that includes a delete control, where the other context menu is overlaid on the event on the timeline, detecting an activation of the delete control, and removing the event on the timeline.

According to some examples, a computing device to locate an event on a timeline may be described. The computing device may include a display device, a memory, and a processor coupled to the memory and the display device. The processor may be configured to execute a calendar application in conjunction with instructions stored in the memory. The calendar application may be configured to detect a selection action on the event on a calendar, display a context menu on the calendar in a location that includes one from a set of: in proximity to, adjacent to, and superimposed on the event on the calendar, where the context menu includes a search control, on the display device, detect an activation of the search control, locate the event on the timeline associated with the calendar, and display the event on the timeline, on the display device.

According to some examples, the calendar application is further configured to identify the selection action from one from a set of: a swipe action, a tap action, a double-tap action from a non-selection action that includes one from a set of: a tap and hold action and a scroll action. The calendar application is further configured to detect a second selection action on the event on the calendar, display the context menu on the calendar that includes a delete control, on the display device, detect an activation of the delete control, and remove the event on the timeline.

According to some examples, a computer-readable memory device with instructions stored thereon to locate an event on a timeline may be described. The instructions may include actions that are similar to the method described above.

According to some examples, a means to locate an event on a timeline may be described. The means to locate an event on a timeline may include a means for detecting a first selection action on the event displayed on a calendar, a means for displaying a context menu on the calendar that includes a search control, a means for detecting a selection action on the event on a calendar, a means for displaying a context menu on the calendar, where the context menu includes a search control, a means for detecting an activation of the search control, a means for locating the event on the timeline of the calendar, and a means for displaying the event on the timeline.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device, the method comprising:
enabling display of, through a user interface of a calendar application rendered on a display device, a calendar view and a scrollable timeline, the timeline including a linear representation of selected events on the calendar view and represents a first date range within the calendar view, wherein the first date range is different from a second date range displayed on the calendar view;
detecting a move action to change a date of an event on the calendar view or the timeline;
in response to the move action detected on the calendar view, moving the event on the timeline to a new date indicated by the move action;
in response to the move action detected on the timeline, moving the event on the calendar view to the new date;
in response to detecting a selection action of the event on the calendar view, enabling display of a context menu on the calendar view at a location based on a location of the event on the calendar view, the context menu including a search control;
detecting an activation of the search control; and
in response to detecting the activation of the search control, scrolling the timeline to display a third date range including the date of the event and enabling display of the event on the timeline.

2. The method of claim 1, further comprising:
highlighting a current date on the timeline in response to the date of the event on the timeline being within a date range including the current date.

3. The method of claim 1, further comprising:
highlighting the event on the calendar view through an animation that includes one from a set of: a blinking animation applied to the event, a rotating animation applied to the event, a fade in animation applied to the event, and an animated object that encompasses the event.

4. The method of claim 1, the location including one or more from a set of: in proximity to the event on the calendar view, adjacent to the event on the calendar view, and superimposed on the event on the calendar view.

5. The method of claim 1, wherein the location includes a first location and further comprising:
detecting a second selection action on a second event displayed on the timeline; and
enabling display of a second context menu on the timeline at a second location on the timeline different from the first location and based on a location of the second event on the timeline, the second context menu including a second search control.

6. The method of claim 5, further comprising:
detecting an activation of the second search control; and
in response to detecting the activation of the second search control, locating the second event on the calendar view and enabling display of the second event on the calendar view.

7. The method of claim 1, further comprising:
detecting an activation of a recurring event control on the context menu; and
in response to detecting the activation of the recurring event control, creating a recurring event from the event on the calendar view.

8. The method of claim 7, further comprising:
duplicating the recurring event on the timeline; and
scrolling to a time period within the timeline, the time period including a start date associated with the recurring event.

9. The method of claim 1, further comprising:
detecting a second selection action on the event on the timeline; and
enabling display of a second context menu on the timeline, the second context menu including a delete control.

10. The method of claim 9, further comprising:
detecting an activation of the delete control; and
in response to detecting the activation of the delete control, removing the event on the timeline.

11. A computing device comprising:
a processor coupled to a memory, the processor configured, via execution of a calendar application instructions stored in the memory to:
enable display, through a user interface rendered on a display device, a calendar view and a scrollable timeline, the timeline including includes a linear representation of selected events on the calendar view and represents a first date range within the calendar view, wherein the first date range is different from a second date range displayed on the calendar view;
detect a move action to change a date of a first event on the calendar view or the timeline;
in response to the move action detected on the calendar view, move the first event on the timeline to a new date indicated by the move action;
in response to the move action detected on the timeline, move the first event on the calendar view to the new date;
in response to a selection action of the first event detected on the calendar view, enable the display of a context menu on the calendar view at a first location based on a location of the first event on the calendar view, the context menu including a search control;
in response to a selection action of a second event detected on the calendar view, enable the display of the context menu on the calendar view at a second location different than the first location and based on a location of the second event on the calendar view;
detect an activation of the search control; and
in response to detecting the activation of the search control, automatically adjust the timeline to display a third date range including the date of the event and enable display of the event on the timeline.

12. The computing device of claim 11, wherein the processor is further configured to:
identify the selection action of the first event or the second event from one from a set of: a swipe action, a tap action, and a double-tap action from a non-selection action that includes one from a set of: a tap and hold action and a scroll action.

13. The computing device of claim 11, wherein the context menu displayed on the calendar view at the first location includes a delete control.

14. The computing device of claim 13, wherein the processor is further configured to:
detect an activation of the delete control; and
in response to detecting activation of the delete control, remove the first event on the timeline.

15. A non-transitory computer-readable medium comprising instructions that, when executed by a processor, provide a calendar service configured to:
provide a calendar view and a scrollable timeline, the timeline including a linear representation of selected events on the calendar view and represents a first date range within the calendar view, wherein the first date range is different from a second date range rendered on the calendar view;
receive a move action to change a date of an event on the timeline to a new date;
in response to receiving the move action, reschedule the event on the timeline to the new date and reschedule the event on the calendar view to the new date;
enable the display of a context menu on the timeline at a location that is based on the location of the event on the timeline in response to a selection action of the event, wherein the context menu includes a search control;
detect an activation of the search control; and
in response to detecting the activation of the search control, automatically scrolling the calendar view to display a third date range including the date of the event and enabling display of the event on the calendar view.

16. The non-transitory computer-readable medium of claim 15, wherein the calendar service is further configured to
receive a move action to change a date of a second event on the calendar view to a new date; and
in response to receiving the move action to change the data of the second event on the calendar view, reschedule the second event on the calendar view to the new date and reschedule the second event on the timeline to the new date.

17. The non-transitory computer-readable medium of claim 15, wherein the calendar service is further configured to
detect a delete action for the event on the timeline;
remove the event from the timeline in response to the delete action; and
remove the event on the calendar view in response to the delete action or in response to further input.

* * * * *